PHASE DETECTOR AND COLOR KILLER

Original Filed July 15, 1953 4 Sheets-Sheet 1

PHASE DETECTOR AND COLOR KILLER

Original Filed July 15, 1953 4 Sheets-Sheet 2

PHASE DETECTOR AND COLOR KILLER

Original Filed July 15, 1953 4 Sheets-Sheet 3

United States Patent Office

Re. 26,852
Reissued Apr. 7, 1970

26,852

PHASE DETECTOR AND COLOR KILLER

Donald Richman, Fresh Meadows, N.Y., assignor to Hazeltine Research, Inc., Chicago, Ill., a corporation of Illinois Original No. 2,954,425, dated Sept. 27, 1960, Ser. No. 368,067, July 15, 1953. Application for reissue Sept. 10, 1962, Ser. No. 223,581
Int. Cl. H04n *9/48*
U.S. Cl. 178—5.4 28 Claims

Matter enclosed in heavy brackets [ ] appears in the original patent but forms no part of this reissue specification; matter printed in italics indicates the additions made by reissue.

General

The present invention is directed to control apparatus for color-television receivers and, more specifically, to such apparatus in a color-television receiver for receiving a composite color video-frequency signal including a color-synchronizing signal component for controlling the operation of a portion of such receiver.

In a form of color-television system more completely described in an article in the magazine "Electronics" for February 1952, entitled "Principles of NTSC Compatible Color Television," at pages 88–95, inclusive, information representative of the brightness and color of an image being televised is utilized to develop at the transmitter two substantially simultaneous signals, one representative of the brightness or luminance of the image and the other of the chromaticity thereof. The signal representative of luminance is substantially a wide-band signal essentially the same as the conventional monochrome signal translated in present-day monochrome television systems. The signal representative of the chromaticity of the image is a subcarrier wave signal having a frequency less than the highest video frequency, for example, a frequency of approximately 3.6 megacycles and which is modulated at different phase points by signals individually representative of the primary colors of the televised image. These two signals are combined at the transmitter in an interleaved manner to form in a pass band common to both signals a composite color video-frequency signal. In addition to the conventional line-synchronizing and fields-synchronizing signals there is also included a color-synchronizing signal, specifically, a short burst or pulse of approximately ten cycles of the unmodulated subcarrier wave signal having a predetermined reference phase. This pulse is conventionally transmitted on the "back-porch" section of the line-synchronizing signals.

At a color-television receiver in such system, the above-mentioned composite color video-frequency signal is derived and the luminance signal is translated through video-frequency amplifiers and applied to a brilliancy-control electrode of a cathode-ray tube to develop a black-and-white image of the televised scene. There is also included in the receiver a generator for developing a reference signal which is heterodyned with the modulated subcarrier wave signal component of the composite color video-frequency signal to derive the color signals at the different phase points of such wave signal. In order to assure the derivation of proper color signals, the signal developed by the local generator is maintained at the same frequency as and in proper phase with the subcarrier wave signal by means of the color-synchronizing signal. The derived color signals are applied to brilliancy-control electrodes of the image-reproducing device to add color to the black-and-white image formed by the luminance signal.

The receiver in the system just described is a compatible receiver, that is, if a composite color video-frequency signal is being transmitted, then a color image will be reproduced by the receiver, and if only a monochrome signal is being transmitted, then a black-and-white image will be reproduced. However, when such monochrome signal is being transmitted and such black-and-white image is being reproduced, those signal-translating channels in the receiver which normally effect the derivation and translation of the color signals are energized and may have a tendency to translate noise signals, undesired monochrome-signal components, and beat-frequency signals developed by heterodyning of the signal developed by the local reference generator and the monochrome signal. Such signals translated through the color channels are applied to brilliancy-control electrodes of the picture tube and tend to have a deleterious effect on the monochrome image being reproduced. Such effects may take the form of relatively high-visibility beating effects or other noise effects in the reproduced image. It is desirable that the receiver include control apparatus for recognizing the presence or absence of color information in the received signal to control the operation of those channels in the receiver which normally translate the subcarrier wave signal and the color signals derived therefrom. In other words, it is desirable automatically to switch off the receiver color channels when no color signals are being received and to turn on such channels when color signals are being intercepted.

One form of proposed control apparatus to accomplish the above function is a gated peak detector which is operative during the period when the color burst signal would normally be received and which peak detects such burst signal if it is received to develop a control potential. If a burst signal is not present, a control potential should not be developed. Such potential may be utilized to control the state of conductivity of one of the initial amplifiers in the channel for translating the color signals so that such channel is continuously conductive if a burst signal is present and is otherwise nonconductive. However, the system just described is not as accurate in determining the absence or presence of color signals as might be desired. There is a tendency for such peak detector to respond to noise signals as well as color burst signals and to establish different control potentials for varying noise conditions thus making the control of the operation of the color channel uncertain. It is the purpose of control apparatus in accordance with the present invention to minimize such uncertainty in operation.

It is an object of the present invention, therefore, to provide a new and improved control apparatus for a color-television receiver which avoids the aforementioned limitation of prior such control apparatus.

It is another object of the present invention to provide a new and improved control apparatus for a color-television receiver which causes it to function essentially as a monochrome receiver when no signals representative of color are being received.

It is a still further object of the present invention to provide a new and improved control apparatus for a color-television receiver in which those channels in such receiver which normally are responsive to color signals are caused to be conductive when such color signals are present and to be otherwise nonconductive.

It is also an object of the present invention to provide a new and improved control apparatus for a color-television receiver which develops a control effect representative of the presence or absence of color signals in the television signal being received by such receiver.

In accordance with the present invention a synchronizing system which is highly stable in the presence of noise signals comprises means for supplying a synchronizing signal liable to accompanying noise signals, a generator for generating oscillations in synchronism with the synchronizing signal at a desired phase relation thereto but which may be undesirably out of such synchronism, and synchronizing means for normally maintaining the oscillations in synchronism at the desired phase relation with the synchronizing signal. The system also includes means for confining the response of the synchronizing means to noise signals during in-synchronism operation to a narrow pass band of frequencies, whereby its pull-in performance from out-of-synchronism is unsatisfactory and means including a phase detector responsive jointly to the synchronizing signal and to the oscillations for producing a phase indicative unidirectional control signal when the synchronizing signals are in synchronism at the desired phase relation and a lesser control signal both when the synchronizing signal is absent and when it is present but is out of synchronism with the oscillations. The system further includes means responsive to the control signals for conditioning the synchronizing means for improved pull-in performance when operating out of synchronism and for the response when operating in synchronism.

Also in accordance with the present invention, a control system for a color-television receiver comprises means for supplying a composite video-frequency signal including a chrominance component and a color synchronizing signal, a channel for translating the chrominance component, a color reference-signal generator for generating reference oscillations in synchronism with the synchronizing signal at a desired phase relation thereto, and synchronizing means responsive to the synchronizing signal for normally maintaining the reference oscillations in synchronism at the desired phase relation with the synchronizing signal. The system also includes a phase detector responsive jointly to the synchronizing signal and to the reference oscillations for producing a phase indicative unidirectional control signal when the synchronizing signal and oscillations are in-synchronism at the desired phase relation and a lesser control signal when the synchronizing signal is absent. The system further includes means responsive to the control signal for enabling the chrominance channel when the synchronizing signal and oscillations are in synchronism and for disabling the chrominance channel when the synchronizing signal is absent.

For a better understanding of the present invention, together with other and further objects thereof, reference is had to the following description taken in connection with the acompanying drawings, and its scope will be pointed out in the appended claims.

Referring to the drawings:

FIG. 2 is a group of curves useful in explaining the operation of the control apparatus of FIGS. 1 and 1a;

FIG. 3 is another group of curves used in explaining the operation of the control apparatus of FIGS. 1 and 1a;

FIG. 4 is a curve of a control characteristic employed in explaining the operation of the control apparatus of FIGS. 1 and 1a;

FIG. 5 is a curve of another control characteristic used in explaining the operation of the control apparatus of FIGS. 1 and 1a;

Figure 1:
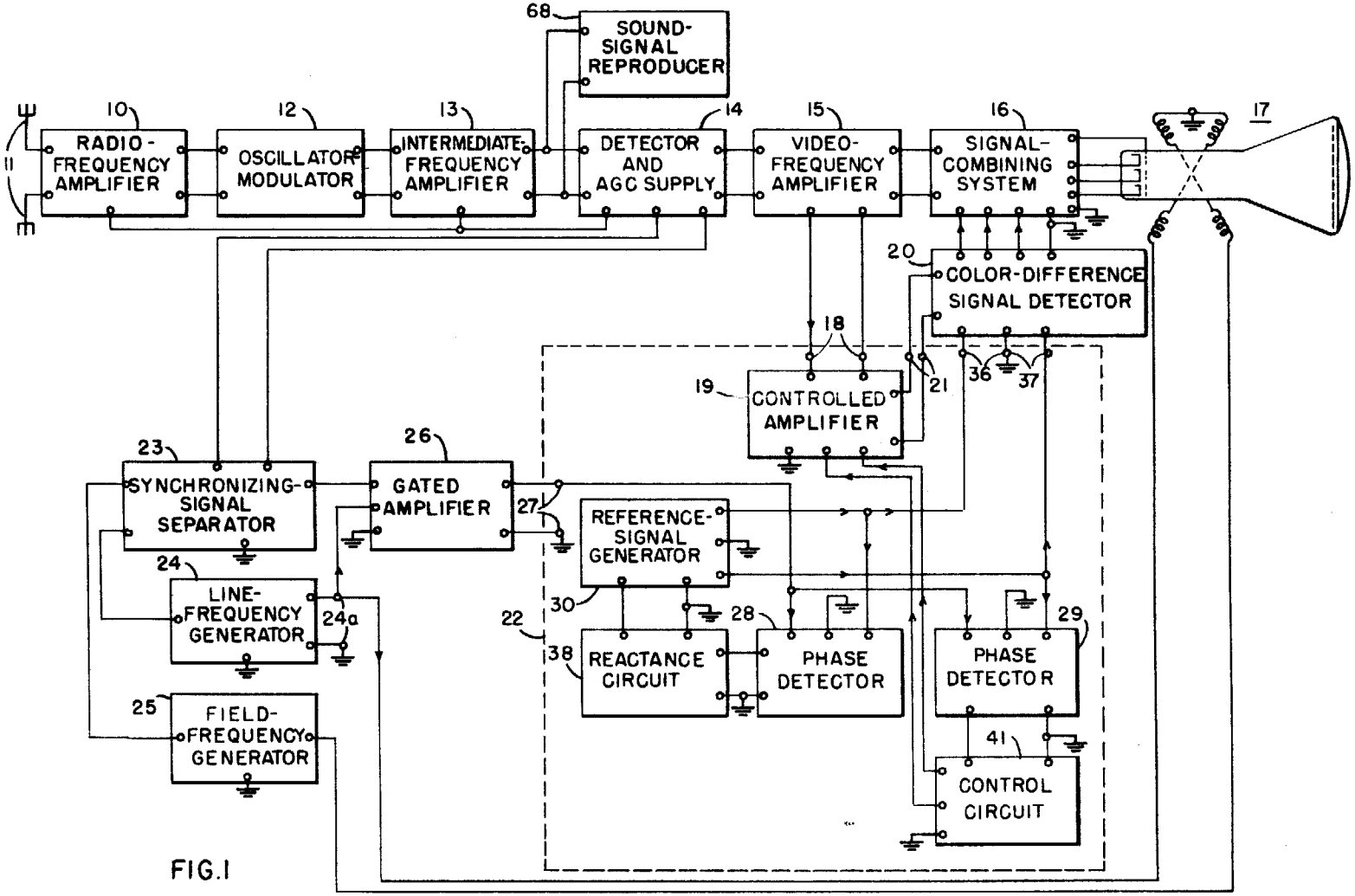
FIG. 1 is a schematic diagram representing a color-television receiver embodying a control apparatus in accordance with one form of the present invention.

General description of receiver of FIG. 1

Referring now to FIG. 1 of the drawings, there is represented a compatible color-television receiver of the superheterodyne type such as may be utilized in an NTSC color-television system of the type previously discussed herein. Such receiver may utilize a conventional monochrome video-frequency signal to reproduce a black-and-white image or a composite color video-frequency signal including a chromaticity component and a color-synchronizing signal component to reproduce a color image. This receiver includes a radio-frequency amplifier 10 of one or more stages having an antenna system 11, 11 coupled to an input circuit thereof. There are coupled to the output circuit of the unit 10, in cascade, in the order named, an oscillator-modulator 12, an intermediate-frequency amplifier 13 of one or more stages, a detector and automatic-gain-control (AGC) supply 14, a video-frequency amplifier 15 of one or more stages, a signal-combining ssytem 16, and an image-reproducing device 17 of the cathode-ray tube type.

The device 17 includes a tube for developing color images from electrical signals applied to the control circuits thereof. A tube of such type is more fully described in an article entitled "A Three-Gun Shadow-Mask Color Kinescope" in the October 1951 Proceedings of the IRE, at pages 1186–1194, inclusive. Briefly, such a tube includes an image screen on which are arranged an orderly array of small closely spaced phosphor dots in triangular groups, each group comprising dots individually responsive to signals representative respectively of primary colors such as green, red, and blue of an image. Interposed between the image screen and the electron gun in the tube, is an apertured mask having a plurality of holes therein, individual ones of which are positioned in register with individual triangular groups of color dots on the image screen. The cathodes are so aligned with the dots through the apertures of the mask that only one electron beam strikes any one dot. The device 17 also includes the usual line-frequency and field-frequency scanning coils for deflecting the cathode-ray electron beams developed in the device in two directions normal to each other to trace a rectilinear raster on the image screen thereof.

There is also coupled to an output circuit of the video-frequency amplifier 15 through a pair of terminals 18, 18, in cascade, in the order named, a controlled amplifier 19 and a color-difference signal detector 20 having a plurality of output circuits connected through the signal-combining system 16 to different ones of a plurality of cathodes in the device 17. The amplifier 19 is a unit in a control apparatus 22 to be considered more fully hereinafter, and the color-difference signal detector comprises a plurality of synchronous detectors for heterodyning the aforementioned modulated subcarrier wave signal with a locally generated signal having the same frequency but with different phases to derive the color-difference signals which are the modulation components at the different phase points of the subcarrier wave signal. Such synchronous detectors are conventional units in the above-described NTSC system and are more fully described in the aforementioned article in "Electronics" for February 1952.

An output circuit of the unit 14 is coupled through a synchronizing-signal separator 23 to a line-frequency generator 24 and a field-frequency generator 25, the output circuits of the latter units being coupled to line-frequency and field-frequency deflection windings, respectively, in the device 17. An output circuit of the separator 23 and of the line-frequency generator 24 are coupled to input circuits of a gated amplifier 26, the output circuit of which is coupled through a pair of terminals 27, 27 to input circuits of a pair of phase detectors 28, 29 in the control apparatus 22.

The output circuit of the intermediate-frequency amplifier 13 is also coupled to a conventional sound-signal reproducer 68 which may include a conventional sound-signal intermediate-frequency amplifier, a frequency detector, an audio-frequency amplifier, and a sound-signal reproducing device. The automatic-gain-control supply in the unit 14 is coupled to one or more of the input circuits in the units 10, 12, and 13 in a well-known manner.

It will be understood that the antenna system, 11, 11 the units 10, 12–17, inclusive, 20, 23–26, inclusive, and 68 may be of conventional construction and operation so that a detailed description and explanation of operation thereof are considered unnecessary herein.

General explanation of operation of television receiver

Considering briefly now the general operation of the above-described receiver as a whole, television signals intercepted by the antenna system 11, 11 are selected and amplified in the radio-frequency amplifier 10 and applied to the oscillator-modulator 12 wherein they are converted to intermediate-frequency signals. The latter signals are in turn selectively amplified in the intermediate-frequency amplifier 13 and the modulation components thereof are derived in the detector 14. These derived components comprise a composite color video-frequency signal and include luminance and chromaticity signals as well as line-frequency, field-frequency, and color-synchronizing signal components. The luminance and chromaticity signals are amplified in the video-frequency amplifier 15 and the luminance signals are translated through the signal-combining system 16 and applied to a brilliancy-control electrode of the image-reproducing device 17. The chromaticity signal or modulated subcarrier wave signal is translated through the amplifier 19 in a manner to be described more fully hereinafter and applied to the color-difference signal detector 20 wherein, in a manner more fully explained in the aforementioned article in "Electronics," the color-signal components or color-difference signals at the different phase points of the modulated subcarrier wave signal and representing, for example, the green, red, and blue of the televised image are derived and individually applied through the signal-combining system 16 to separate ones of the cathodes in the picture tube of the device 17.

The synchronizing components including the line-frequency and field-frequency signals and the color-synchronizing signal are separated from each other and from the video-frequency signals in the unit 23. The line-frequency and field-frequency synchronizing components are utilized to control the operation of the generators 24 and 25, respectively, signals developed in the output circuits of these generators being applied to the deflection windings in the device 17 to cause the electron beams emitted from the cathodes of the tube in the device 17 to trace a rectilinear pattern on the image screen of the tube. The intensities of the beams emitted from the cathodes are individually controlled by the brightness signal applied to the control electrode of the tube and different ones of the color signals applied to the different ones of the cathodes. The rectilinear trace together with the intensity control of the beams and the physical alignment of different ones of the cathodes through the different apertures in the aperture mask with different ones of the phosphor dots on the image screen cause the different dots to be excited and the color image to the televised scene to be reproduced within the raster traced on the image screen. The color-synchronizing signal is applied to an input circuit of the gated amplifier 26 from the separator 23 and the amplifier 26 is rendered conductive during the line-blanking period by a signal applied from the line-frequency generator 24 to the amplifier 26 so that the color-synchronizing signal is applied to input circuits of the phase detectors 28 and 29 during each line-blanking period.

The automatic-gain-control potential developed in the supply 14 is applied to the gain-control circuits of the units 10, 12, and 13 to maintain the signal input to the detector 14 within a relatively narrow range for a wide range of received signal intensities. The audio-frequency modulation components of the received signal are derived in a conventional manner by a sound-signal detector in the unit 30 and amplified and reproduced in such unit.

Figure 1A:
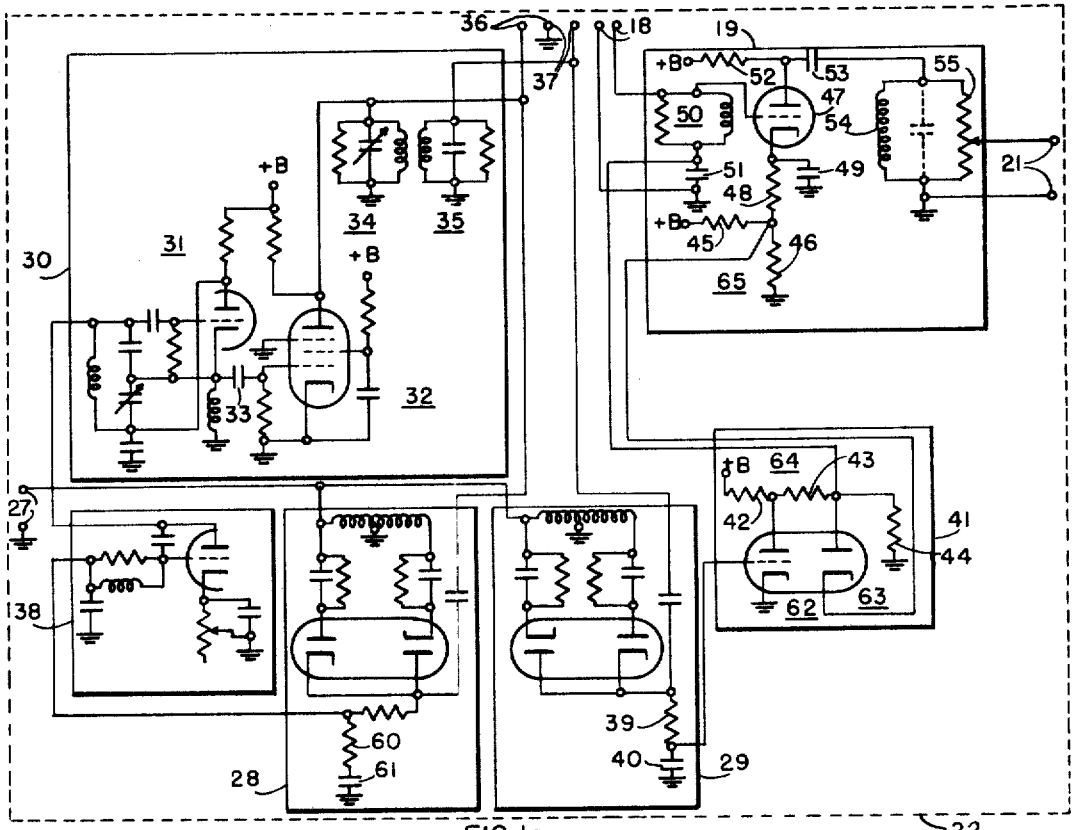
FIG. 1a is a circuit diagram representing in more detail the control apparatus of FIG. 1.

Description of control apparatus of FIGS. 1 and 1a

Referring now to the control apparatus 22 of FIG. 1, such unit comprises a color-synchronizing signal input circuit, specifically, the pair of terminals 27, 27 and the circuit coupling the output circuit of the gated amplifier 26 to input circuits of the phase detectors 28 and 29.

The control apparatus also includes a signal generator, specificaly, a reference-signal generator 30 of FIG. 1 for generating a pair of signals individually having different desirable phases with respect to the color-sychronizing signal but which undesirably tend to vary from such desirable phases. Referring to FIG. 1a for a more detailed representation of the generator 30, and such will be done hereinafter for all circuit details of the units in the control apparatus 22, such generator includes a conventional oscillator 31 having the parameters of the circuit elements thereof proportioned so that the oscillator generates a sine-wave signal having the same frequency as the color-synchronizing signal, for example, having a frequency of approximately 3.58 megacycles and further includes a conventional buffer amplifier 32 having the control electrode thereof coupled through a condenser 33 to the cathode of the oscillator 31. The generator 30 includes a signal-developing circuit responsive to the signal developed by the oscillator 31 to develop the aforementioned pair of signals, specifically, the amplifier 32 has a tuned circuit 34 resonant, for example, at approximately 3.58 megacycles coupled to the anode thereof and another tuned circuit 35 similarly resonant and loosely inductively coupled to the circuit 34. The tuned circuits 34 and 35 are so coupled that the signal developed in the circuit 35 is in quadrature phase with the signal developed in the circuit 34 whereby a first signal is developed in the network 35 which is desirably in phase with the color-synchronizing signal and a second signal is developed in the network 34 which is desirably in quadrature phase therewith. The network 35 is coupled through a pair of terminals 37, 37 and the network 34 is coupled through another pair of terminals 36, 36 to different input circuits of the color-difference signal detector to control the operation of such detector. Additionally, the network 35 is coupled to an input circuit of the detector 29 while the network 34 is similarly coupled to an input circuit of the detector 28.

The control apparatus also includes a first phase-detector system, specifically, the phase detector 28, and a conventional reactance circuit 38 coupled between such phase detector and a frequency-control input circuit of the generator 30. As previously described, the detector 28 is coupled through the terminals 27, 27 to the gated amplifier 26 and is responsive jointly to the color-synchronizing signal and one of the signals generated in the generator 30, specifically, to the signal developed in the resonant circuit 34 for maintaining the generated signals with the aforementioned desirable phases. Referring to FIG. 1a, the phase detector 28 includes a signal-integration circuit comprising a resistor 60 in series with a condenser 61 in the output circuit thereof for developing a correction signal representative of the phase relation of the signal developed in the circuit 34 and the color-synchronizing signal. The detector 28 and the reactance circuit 38 are of conventional types utilized in automatic-phase-control systems for maintaining the operation of the generator 30 in synchronism.

The control apparatus also comprises a second phase-detector system, specifically, the unit 29 coupled to the aforementioned input circuit, that is, to the pair of terminals 27, 27 and therethrough to the gated amplifier 26 and also coupled to the generator 30, specifically, to the resonant circuit 35 and responsive to the color-synchronizing signal and the signal developed in the network 35 for developing a unidirectional control signal representative of the phase relation of the signal developed in the network 35 and the synchronizing signal. The phase detector 29 is a conventional phase detector similar to the detector 28. It includes an integration circuit comprising a resistor 39 and a condenser 40 in series as a load circuit therefor to develop the aforementioned undirectional control signal thereacross.

The control apparatus also comprises a circuit for applying such unidirectional signal to the color-television receiver to control the operation thereof. More specifically, referring to FIG. 1a, the latter circuit includes a control circuit 41 having an input circuit coupled to the integration circuit 39, 40 in the detector 29 and an output circuit coupled to a control-electrode circuit in the controlled amplifier 19 to control the conductivity of the amplifier 19 so as to cause the signal-translating channel including such amplifier to be conductive when composite color video-frequency signals are being received and to be nonconductive when monochrome video-frequency signals are being received. More specifically, the control circuit 41 comprises an electron-discharge device such as a triode section 62 having the control electrode thereof coupled to the integration circuit 39, 40, the cathode connected to chassis-ground, and the anode connected to an intermediate terminal on a voltage divider 64 comprising series-connected resistors 42, 43, and 44 connected across a source of potential +B. The control circuit also includes an electron-discharge device such as a diode section 63 having the anode thereof connected to another intermediate terminal on the voltage divider 64 and the cathode connected to an intermediate terminal on a voltage divider 65 comprising series-connected resistors 45 and 46 coupled across the source of potential +B and included as part of the gated amplifier 19.

The control apparatus may also include a signal-translating channel for translating the chromaticity component of the received composite video-frequency signal, more specifically, the controlled amplifier 19. Referring to FIG. 1a, the unit 19 includes an electron-discharge device such as a triode 47 having a cathode network including a resistor 48 coupled between the cathode and the intermediate terminal on the voltage divider 65, and also a by-pass condenser 49 coupled between the cathode and chassis-ground. The control-electrode circuit of the tube 47 is coupled to the pair of terminals 18, 18 and includes a tuned circuit 50 connected in series with a condenser 51 between the control electrode of the tube 47 and ground. The ungrounded terminal of the condenser 51 is also connected to the anode of the diode 63 in the control circuit 41. The tuned circuit 50 comprises a band-pass filter having a pass band, for example, of 2.5–4.3 megacycles for translating the band of video-frequency signals including the modulated subcarrier wave signal which is applied to the terminals 18, 18. The anode of the tube 47 is connected through a load resistor 52 to a source of potential +B and through a coupling condenser 53 to a load circuit comprising, in parallel, an inductor 54, the inherent capacitance of the output circuit and represented by dashed lines, and a voltage divider 55. The load circuit is broadly tuned to approximately the same range of frequencies as the input circuit 50. The tapped portion of the voltage divider 55 is coupled through the pair of terminals 21, 21 to an input circuit of the color-difference signal detector 20.

Explanation of operation of control aparatus of FIGS. 1 and 1a

Considering now the operation of the control apparatus 22 of FIGS. 1 and 1a, the oscillator 31 in the generator 30 develops a sine-wave signal having a frequency of approximately 3.58 megacycles under the control of a control effect developed by the reactance circuit 38 and the units 26 and 28. The buffer amplifier 32 amplifies such signal and develops therefrom a signal in the network 34 which is in antiphase with the signal developed by the oscillator 31 and another signal in the network 35 which is in quadrature phase therewith. The aitiphase and quadrature signals are applied to input circuits of the color-difference signal detector 20 to heterodyne with the modulated subcarrier wave signal applied to such detector from the amplifier 19 to derive the modulation components of the subcarrier wave signal at quadrature-phase points thereof. As more fully explained in the aforementioned article in "Electronics," quadrature signals representative of the two primary colors of the image individually occur as quadrature modulation signals on the subcarrier wave signal and are derived by the aforementioned heterodyning of the subcarrier wave signal and different ones of the signals developed in the networks 34 and 35. These derived signals may be then combined in a matrixing apparatus which is conventionally part of the unit 20 to develop signals representative of primary colors, for example, the green, red, and blue of the televised image. The latter signals combine in the device 17 with the luminance or brightness signal to effect a reproduction of the televised image in color therein. It should be apparent that in order to derive the proper quadrature signals, the signals developed by the generator 30 and the modulated subcarrier wave signal should be in proper frequency and phase relationships so that the heterodyning of these signals in the detector 20 occurs at the proper phase points of the subcarrier wave signal to derive the modulation signals at those phase points. In order to maintain such signal relationship, a color-synchronizing signal comprising a few cycles, in other words, a short burst of unmodulated subcarrier wave signal is transmitted and received. These few cycles conventionally have a predtermined phase with respect to the subcarrier wave signal and should have predtermined phases with respect to the signals developed by the resonant circuits 34 and 35, specifically, the color-synchronizing signal should be in quadrature with the signal developed by the network 34.

Figure 2:
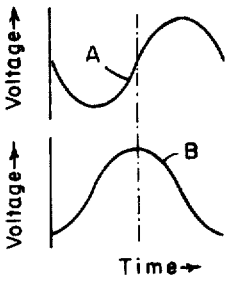
Figure 4:
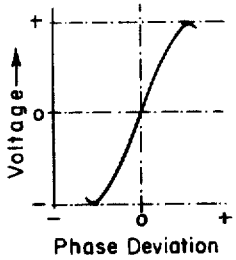

In order to utilize this color-synchronizing signal to effect such phase relationships by controling the frequency of the signal developed by the oscillator 31, as previously mentioned, the amplifier 26 is gated into a conducting condition during line retrace by the line-frequency retrace signal normally developed in the output circuit of a line-frequency generator, such as the unit 24, and applied to an input circuit of the amplifier 26 as previously described and explained herein. While the amplifier 26 is in a conductive condition, the color-synchronizing signal is applied to one input circuit of each of the phase detectors 28 and 29. Considering now only the operation of the phase detector 28, the signal developed in the circuit 34 is applied to another input circuit of the detector 28 and should, if the generator 30 is operating in a synchronous manner, be in quadrature phase with the color-synchronizing signal. Such phase relation is represented by curves A and B of FIG. 2 where curve A represents a cycle of the color-synchronizing signal and curve B represents a cycle of the signal generated in the network 34. If these signals are in quadrature phase, as represented by FIG. 2, the characteristic of the phase detector 28 is such that no correction signal is developed in the output circuit of the detector 28. If, however, due to asynchronous operation of the oscillator 31 such quadrature phase relation does not exist, a correction signal is developed in the integration circuit 60, 61 of the detector 28 having a magnitude between zero and a maximum positive value for phase deviations up to 90 degrees in one sense and another correction signal having a magnitude between zero and a maximum negative value is developed for phase deviations up to 90 degrees in the other sense. The curve of FIG. 4 represents the potentials of such correction signal over the maximum range of phase deviations above and below the proper frequency. Such correction signal, if developed, is applied to the reactance circuit 38 to control the frequency of the signal developed by the oscillator 31 in a conventional manner so as to reduce the magnitude of such correction signal to zero.

As previously explained herein, an NTSC type of receiver is capable of utilizing both composite color video-frequency signals for reproducing a color image or monochrome video-frequency signals for reproducing a black-and-white image. It is desirable to disable the signal-translating channel for translating the chromaticity component of the composite color video-frequency signals, for example, to disable the amplifier 19 whenever only a monochrome video-frequency signal is being received and utilized so that the circuits normally utilized to translate, derive, and effect reproduction of the color information will not cause undesired effects to be developed in the reproduced monochrome image. In order to effect automatic disabling of the channels through which the color signals are normally translated, there is need for a control signal which positively indicates the presence or absence of such color information. Since a color burst or color-synchronizing signal accompanies color information, it has been found desirable to develop in the receiver such control signal by means of a circuit which recognizes the presence or absence of such color burst signal.

It is a characteristic of a phase detector such as the unit 28 to require the presence of a color-synchronizing signal and a locally developed signal such as applied to the detector 28 by the circuit 34 to operate in a normal manner. However, the control potential developed by such detector and represented by the curve of FIG. 4 is desirably zero or a minimum when proper synchronism is effected, that is, when the color-synchronizing signal is being received and the generator 30 is in synchronism therewith and is also a minimum or zero potential when no color-synchronizing signal is being received. The maximum control potentials in the positive and negative senses are developed in the detector 28 when the phase of the locally developed signal differs by $\pm 90$ degrees from that required for synchronous operation. When a phase deviation of greater than $\pm 90$ degrees is present, then the phase detector is unable to recognize the presence or absence of such color-synchronizing signal. Therefore, a phase detector such as the unit 28 does not develop a signal which positively represents the presence or absence of the color-synchronizing signal and is undesirable as a circuit for controlling the state of conduction of a channel for translating color signals.

Figure 3:
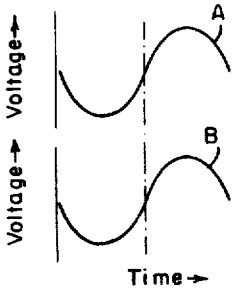
Figure 5:
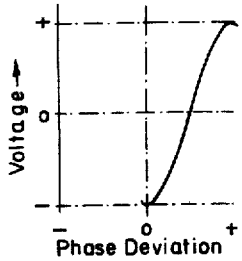

If the color-synchronizing signal and a locally generated signal, such as that developed by the network 35, are normally in phase with each other when the generator 30 is operating in a synchronous manner and such signals are applied to a phase detector, such as the unit 29, then they will have the relationship represented by curves A and B of FIG. 3 and a unidirectional signal, such as represented by the curve of FIG. 5, will be developed in the integration circuit 39, 40 as these signals deviate in phase over a range of approximately 180 degrees. Considering the curve of FIG. 5, a maximum negative signal is developed across the integration circuit 39, 40 when the color-synchronizing signal represented by curve A of FIG. 3 and the signal developed in the network 35 and represented by curve B of FIG. 3 are in phase. As such signals deviate from such phase relation, the signal developed in the integration network 39, 40 and represented by the curve of FIG. 5 diminishes from the maximum negative value toward zero. Consequently, the signal developed across the integration circuit 39, 40 positively identifies the presence or absence of the color-synchronizing signal by having a maximum magnitude when such color-synchronizing signal is present, that is, when synchronism is effected and less than such maximum magnitude at all other times. Therefore, what is required in accordance with the present invention is that a first phase-detector system be included in the control apparatus to effect synchronization, and a second phase detector be included which compares the signals applied thereto in phase instead of in quadrature phase to develop a unidirectional control potential positively representative of the presence or absence of the color-synchronizing signal and therefore of the reception of a composite color video-frequency signal or a monochrome video-frequency signal.

Consider now the manner in which the unidirectional control potential developed in the integration circuit including elements 39 and 40 is utilized to control the operation of the color-television receiver, specifically, to control the conductivity of the amplifier 19. Such negative potential indicating the presence of the color-synchronizing signal conventionally maintains the triode 62 in the control circuit 41 in a nonconductive state. With such tube nonconductive, the potential on the intermediate terminal of the voltage divider 64 and applied to the control electrode of the triode 47 in the controlled amplifier 19 maintains the control electrode of the triode 47 at a fixed bias which is slightly positive with respect to the bias on the cathode of the tube 47. Thus, the tube 47 is conductive and the modulated subcarrier wave signal is translated therethrough for application to the color-difference signal detector 20. During this period of time, the diode in the control circuit 41 is also conductive, limiting the magnitude of the positive potential on the control electrode of the triode 47 to approximately that at the junction of the resistors 46 and 48 in the cathode circuit of the triode 47. If a color-synchronizing signal is not received, then the potential across the integration circuit including the elements 39, 40 drops to substantially zero and the triode 62 starts to conduct causing the positive potential applied to the control electrode of the tube 47 to decrease due to the change in the potentials developed at the different intermediate terminals on the voltage divider 64. The diode 63, because of the low positive potential on the anode thereof, becomes nonconductive and the potential on the cathode of the triode 47 drops slightly from the previous positive potential due to the cessation of anode-cathode current in the cathode circuit of the tube 47. However, such cathode is still more positive than the control electrode of the tube 47 due to the potential applied to the cathode from the voltage divider 65 and, therefore, the tube 47 ceases to conduct and no signals are translated from the terminals 18, 18 to the output terminals 21, 21. In this manner, the conductivity of the amplifier 19 and, thus, of the signal-translating channel in the color-television receiver of FIG. 1 for translating the chromaticity component of the received composite color video-frequency signal is positively controlled depending upon the presence or absence of the color-synchronizing signal.

While applicant does not intend to be limited thereby, the following more important circuit constants are presented as illustrative of values that may be utilized in the control circuit of FIG. 1a;

| | | |
|---|---|---|
| Resistor **39** | kilohms | 100 |
| Resistor **42** | do | 270 |
| Resistor **43** | do | 560 |
| Resistor **44** | do | 68 |
| Resistors **45** and **52** | do | 15 |
| Resistor **46** | ohms | 820 |
| Resistor **48** | do | 220 |
| Resistor **55** | do | 520 |
| Condenser **40** | microfarads | .22 |
| Condenser **49** | do | .01 |
| Condenser **51** | micromicrofarads | 5,000 |
| Condenser **53** | do | 2,000 |
| Inductor **54** | microhenries | 200 |
| +B | volts | 375 |
| Triode **62** and diode **63** | | Type 6T8 |
| Tube **47** | | Type 6AB4 |

Figure 6:
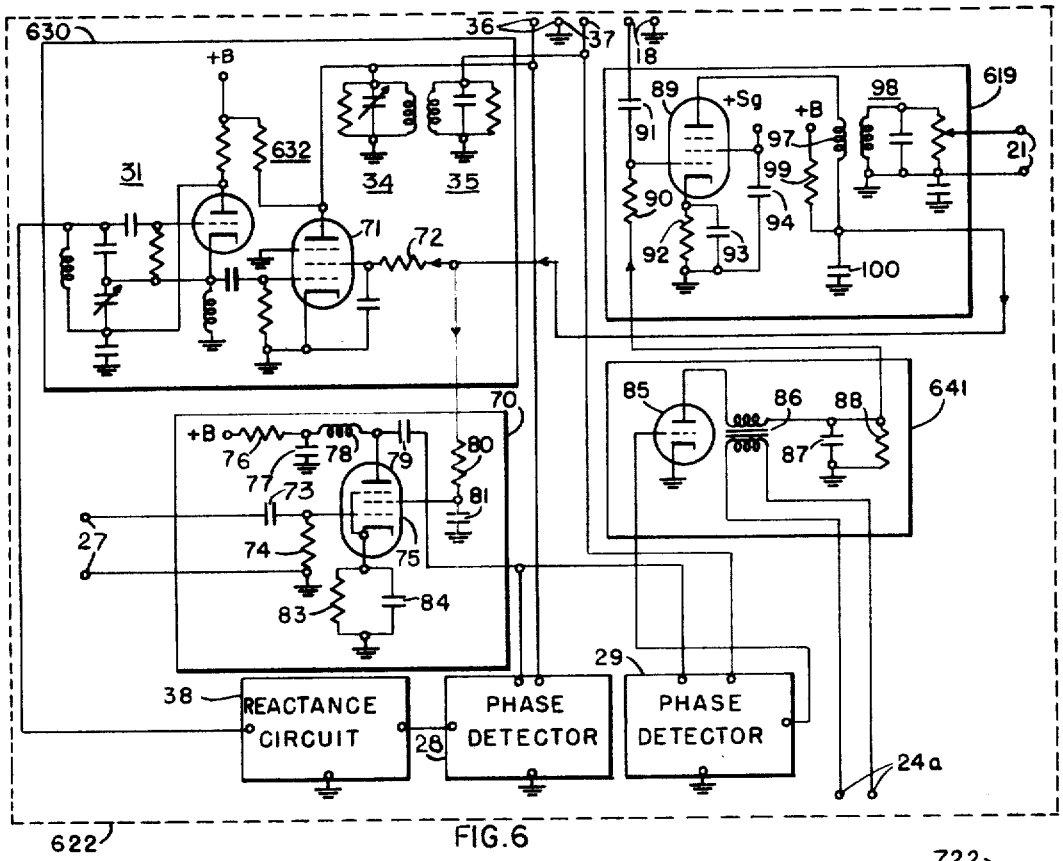
FIG. 6 is a circuit diagram, partly schematic, of another form of a control apparatus in accordance with the present invention.

Description of control apparatus of FIG. 6

In addition to controlling the conductivity of the signal-translating channel for translating chromaticity signals, it may also be desirable to utilize the control signal developed by the previously described apparatus and representative of the presence or absence of the color-synchronizing signal to control the operation of other units of the color receiver. For example, it may be desirable to control the operating characteristics of the APC system to increase the pull-in range thereof or to decrease the pull-in time so that the APC system has intended pull-in range when the system is not in synchronism and has decreased pull-in range, a narrower pass band for noise signals, and improved stability when the system is in synchronism. The control apparatus of FIG. 6 utilizes the unidirectional control signal for the purposes just described.

Many of the units and circuit elements of the apparatus of FIG. 6 are similar to corresponding units or elements in the apparatus of FIG. 1a and are, therefore, designated by the same reference numerals. Other units and elements in the apparatus of FIG. 6 correspond to elements in the apparatus of FIG. 1a but differ therefrom and are, therefore, designated by the same reference numerals with 600 added thereto. Units and circuit elements not corresponding to any in the apparatus of FIG. 1a are designated by numerals between 70 and 100.

Referring now to FIG. 6 of the drawings, the color-synchronizing signal input circuit including the pair of terminals 27, 27 includes an amplifier 70 coupled between such terminals and the input circuits of the phase detectors 28 and 29. Such amplifier is of a conventional type including a tube such as a pentode 75 having a biasing network including a condenser 73 and a resistor 74 coupled between the control electrode thereof and the pair of terminals 27, 27. The cathode of the tube 75 is coupled to ground through a resistor 83 and a condenser 84 in parallel while the anode of the tube 75 is connected to a source of +B potential through a choke 78 and a resistor 76 in series, the junction of such resistor and coil being coupled to ground by a by-pass condenser 77. The condenser 77 is of such magnitude as to provide a low-impedance path to ground for all signals other than those at approximately the frequency of the color-synchronizing signal. The anode of the tube 75 is also connected to the aforementioned input circuits of the phase detectors 28 and 29 through a coupling condenser 79. The screen electrode of the tube 75 is connected to ground through a by-pass condenser 81 and through a resistor 80 to an output circuit of the gated amplifier 619.

The signal generator 630 includes the oscillator 31 and a modified buffer amplifier 632. The modification of the buffer amplifier 632 comprises the connection of the screen electrode of the pentode 71 through a resistor 72 to the same output circuit of the gated amplifier 619 to which the screen electrode of the tube 75 in the amplifier 70 is connected.

The control circuit 641 for applying the unidirectional signal developed by the second phase-detector system including the detector 29 to the gated amplifier 619 to control the state of conduction or translating characteristic of such amplifier is quite different from the corresponding control circuit of FIG. 1a. The control circuit 641 includes a tube such as a triode 85 having the control electrode thereof coupled to the output circuit of the phase detector 29 and the cathode thereof connected to chassis-ground. The anode of the tube 85 is connected through the secondary winding of a transformer 86 to a load circuit including in parallel a condenser 87 and a resistor 88. The primary winding of the transformer 86 is connected through a pair of terminals 24a, 24a to the output circuit of a line-frequency generator such as the unit 24 of FIG. 1.

The controlled amplifier 619 of FIG. 6 is also quite different from the corresponding amplifier of FIG. 1a and includes a tube such as a pentode 89 having the control-electrode circuit thereof connected through a coupling condenser 91 to the pair of input terminals 18, 18 and through an isolating resistor 90 to the load circuit in the unit 641 including the condenser 87 and the resistor 88. The cathode of the tube 89 is connected to chassis-ground through a biasing network including in parallel a resistor 92 and a condenser 93 while the screen electrode thereof is by-passed to chassis-ground through a condenser 94 and is also connected to a positive potential +Sg. The anode of the tube 89 is coupled through a transformer winding 97 and a load resistor 99 to the source of potential +B, the junction of the resistor 99 and the winding 97 being by-pased to chassis-ground for video-frequency signals by a condenser 100. A damped tuned circuit 98 is inductively tightly coupled to the circuit 97 and includes a voltage divider having one terminal and the variable tap thereof connected to the pair of terminals 21, 21. The damped tuned circuit 98 is broadly tuned to a band of frequencies including the subcarrier wave signal and its side bands, for example, to the range of frequencies 2.5–4.3 megacycles. The terminals of the condenser 100 are connected to the screen-electrode circuits of the tubes 71 and 75 in the units 630 and 70, respectively.

Explanation of operation of control apparatus of FIG. 6

The units 28, 19, and 38 operate the manner previously explained with reference to FIG. 1a. The negative potential developed in the output circuit of the detector 29 when the generator 630 is operating in synchronism maintains the triode 85 in the control circuit 641 beyond cutoff and, thus, no control signal is applied to the control electrodes of the pentode 89 from the control circuit 641 and the tube 89 is conductive, thereby amplifying chromaticity signals applied thereto and applying such amplified signals through the coupled networks 97, 98 and the pair of terminals 21, 21 to a unit such as the color-difference signal detector 20 of FIG. 1. At such time, a positive potential is also developed across the condenser 100 in the unit 619 and is applied through the resistors 72 and 80 to the screen electrodes of the tubes 71 and 75, respectively, in the units 630 and 70, respectively. In this manner, the tubes 71 and 75 are maintained at such time in one gain condition and the signals applied by the circuits 34 and 35 to the phase detectors 28 and 29, respectively, and by the color-synchronizing signal amplifier 70 to such detectors have a predetermined intensity determined by the desired intensity for such signals when the generator 630 is operating in synchronism.

If, now the color-synchronizing signal is not being received or at least the phase detector 28 and the reactance circuit 38 have not developed an adequate control effect to cause the generator 630 to operate in synchronism with any color-synchronizing signal being received, then no potential is developed in the output circuit of the phase detector 29 and the triode 85 in the unit 641 becomes conductive. Positive-going retrace pulses are applied to the anode of the tube 85 through the transformer 86 from a unit such as the line-frequency generator 24 of FIG. 1. As the tube 85 conducts, the condenser 87 is charged negatively to an average negative potential which biases the pentode 89 in the controlled amplifier 619 to cutoff, thus preventing any chromaticity or other signals from being translated through the unit 619 from the pair of input terminals 18, 18 to the pair of output terminals 21, 21. This mode of operation corresponds generally to that of the apparatus of FIG. 1a through the manner of effecting such operation is different.

Before considering the manner in which the pull-in range $\Delta f_m$ and pull-in time $T_F$ of the APC system including the units 28, 38, 70, and 630 are automatically modified when the color-synchronizing signal is apparently no longer being received, it will be helpful approximately to define these parameters in terms of more fundamental and more measurable parameters. It has been mathematically determined and experimentally proven that the pull-in range $\Delta f_m$ is proportional to the square root of $2f_c$, the peak-to-peak holding range, and $mf_c$, the gain of the APC system for periodic signals. Thus:

$$\Delta f_m \approx \sqrt{2f_c mf_c} \qquad (1)$$

and the pull in-time $T_F$ is proportional to the parameters defining $\Delta f_m$ and, additionally, to the shunt time constant xT of the integration circuit in the APC system and the instantaneous frequency deviation $\Delta f$ between the locally developed signal and the synchronizing signal. Thus:

$$T_F \approx xT \frac{(\Delta f/mf_c)^2}{1 = \frac{(\Delta f)^2}{2f_c mf_c}} \qquad (2)$$

The magnitudes of the parameters xT and $\Delta f$ are determinable by well-known means. The D.C. loop gain $f_c$ is definable as follows:

$$f_c = \frac{\Delta f}{\Delta E} \cdot \frac{\Delta E}{\Delta \phi} \qquad (3)$$

where $\Delta f/\Delta E$ is the reactance tube sensitivity in terms of the frequency shift $\Delta f$ of the oscillator related to the magnitude of the error voltage $\Delta E$ applied to the reactance tube, and $\Delta E/\Delta\phi$ is the phase detector gain in terms of the magnitude of the error signal $\Delta E$ developed by a phase error $\Delta\phi$.

The A.C. loop gain $mf_c$ is measurable by determining the magnitude of a beat note across the shunt resistor in the integration circuit with the loop open, for example, with the reactance tube decoupled from the oscillator.

Examining Equations 1 and 2 above, it is apparent that an increase in either the D.C. loop gain $f_c$ or the A.C. loop gain $mf_c$ will not only increase the pull-in range $\Delta f_m$ but will also decrease the pull-in time $T_F$. The apparatus 622 of FIG. 6 effects such increased pul-in range and decreased pull-in time by increasing the D.C. loop gain of the APC loop, when apparently no color-synchronizing signal is being received, by increasing the gains of the buffer amplifier 71 and the color-synchronizing signal amplifier 70 during such time. The manner in which such gains are increased will now be described.

As the pentode 89 in the unit 619 ceases to conduct, the positive potential across the condenser 100 rises, for example, by a factor of approximately 3:1. This increased positive potential is applied to the screen electrodes of the buffer amplifier tube 71 in the unit 630 and to the amplifier tube 75 in the color-synchronizing signal amplifier 70 to increase the gains of these tubes. Therefore, the intensities of the signals applied to the detectors 28 and 29 are increased and, if a color-synchronizing signal is being received but the generator 630 is not operating in synchronism, then the pull-in range of the automatic-phase-control system including the units 28 and 38 is extended and, at the same time, the pull-in time is decreased. If a color-synchronizing signal is not being received, then the increase in the gains of the tubes 71 and 75 has no harmful effect while conditioning the automatic-phase-control system to have extended pull-in range and decreased pull-in time at that time when a color-synchronizing signal is first received. To complete the cycle of operation, as soon as the color-synchronizing signal is received and the automatic-phase-control system causes the generator 630 to operate in synchronism, a negative potential is developed by the detector 29, the tube 85 becomes nonconductive, the tube 89 in the gated amplifier stage 619 starts to conduct, the positive potential across the condenser 100 decreases, and the gains of the amplifiers 71 and 75 likewise decrease.

Figure 8:
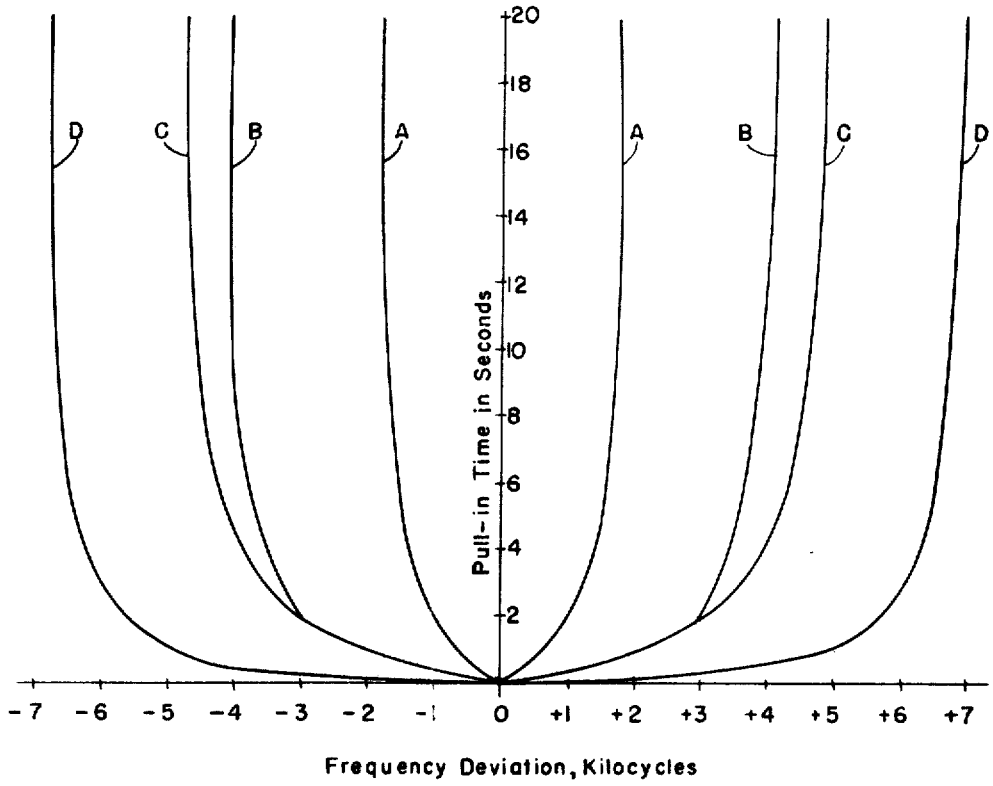
FIG. 8 is a group of curves useful in explaining the operations of the control apparatus of FIGS. 6 and 7.

Considering now FIG. 8, there is represented a group of curves representing the pull-in time and pull-in range characteristics for different modes of operation of a control apparatus such as the unit 622 of FIG. 6. Curve A represents the pull-in time versus initial frequency-deviation characteristics of a conventional automatic-phase-control (APC) system including such units as the phase detector 28 and the reactance circuit 38 operating in accordance with the teachings of the prior art and having conventional circuit parameters. It is apparent that the pull-in range of such system is substantially less than 2 kilocycles and the pull-in time is in excess of 2 seconds for any frequency deviation greater than 1 kilocycle between the color-synchronizing signal and the signal developed in a generator such as the unit 630. The pull-in time rapidly approaches infinity as such frequency deviation becomes greater than 1 kilocycle. An APC system having these characteristics has other highly desirable characteristics when a generator such as the unit 630 of FIG. 6 is operating in synchronism, maintaining such synchronism in an exceptionally stable manner in spite of signal conditions which might tend ordinarily to disturb such synchronous operation. In other words, an APC system having such parameters might be said to maintain tight dynamic control once synchronism is obtained. However, such APC system is not capable of pulling a generator into synchronism quickly or effecting such synchronism if the frequency deviation of the synchronizing signal and the locally generated signal is greater than approximately [*1.5*] kilocycles. It is sometimes desirable, therefore, to have such an APC system for operation in synchronism and to have an APC system with decreased pull-in time and extended pull-in range when the local generator is not operating in synchronism.

The increase in the gains of the amplifiers 71 and 75 of FIG. 6 effected by the increased positive potential developed across the condenser 100 as the amplifier tube 89 is cut off and representing a lack of synchronous operation of the generator 630 greatly extends the pull-in range of the APC system of FIG. 6 and the pull-in time of such system as represented by curve B of FIG. 8. However, it should be understood that the wide pull-in range and decreased pull-in time, represented by curve B, are only desirable when the generator 630 is not operating in synchronism since such extended pull-in range may cause the operation of a generator under the control of an APC system having such extended range to be less stable than a corresponding generator under the control of an APC system having the characteristics represented by curve A of FIG. 8. Therefore, the characteristic represented by curve B of FIG. 8 is desirable for the APC system of FIG. 6 only while the generator 630 is asynchronous and an APC system having a characteristic such as represented by curve A is desired as soon as the generator 630 becomes synchronous in operation. As previously mentioned, the controlling of the gains of the amplifiers 71 and 75 effects such change in the characteristics of the APC system of FIG. 6.

While applicant does not intend to be limited thereby, the following more important circuit constants are presented as illustrative of values that may be utilized in those portions of the control circuit of FIG. 6 which differ from portions of FIG. 1a:

| | | |
|---|---|---|
| Resistor **72** | kilohms | 47 |
| Resistors **76** and **99** | do | 22 |
| Resistor **83** | do | 2.2 |
| Resistor **88** | do | 100 |
| Resistor **92** | ohms | 150 |
| Condenser **79** | microfarads | 0.047 |
| Condensers **81**, **84**, **87**, **93** and **94** | do | 0.01 |
| Condenser **100** | do | 0.068 |
| +Sg. | volts | +150 |
| Tube **75** | Type ½ 6U8 | |
| Tube **85** | Type ½ 6U8 | |
| Tube **89** | Type 6CB6 | |

In addition to these fixed parameters, the dynamic parameters of D.C. and A.C. gains as defined by Equations 1 and 2 above should be such as to cause the APC system to have an operating characteristic such as represented by curve A of FIG. 8 when the system is operating in synchronism and to have at least one of the characteristics represented by curves B, C, or D when not operating in synchronism.

Figure 7:
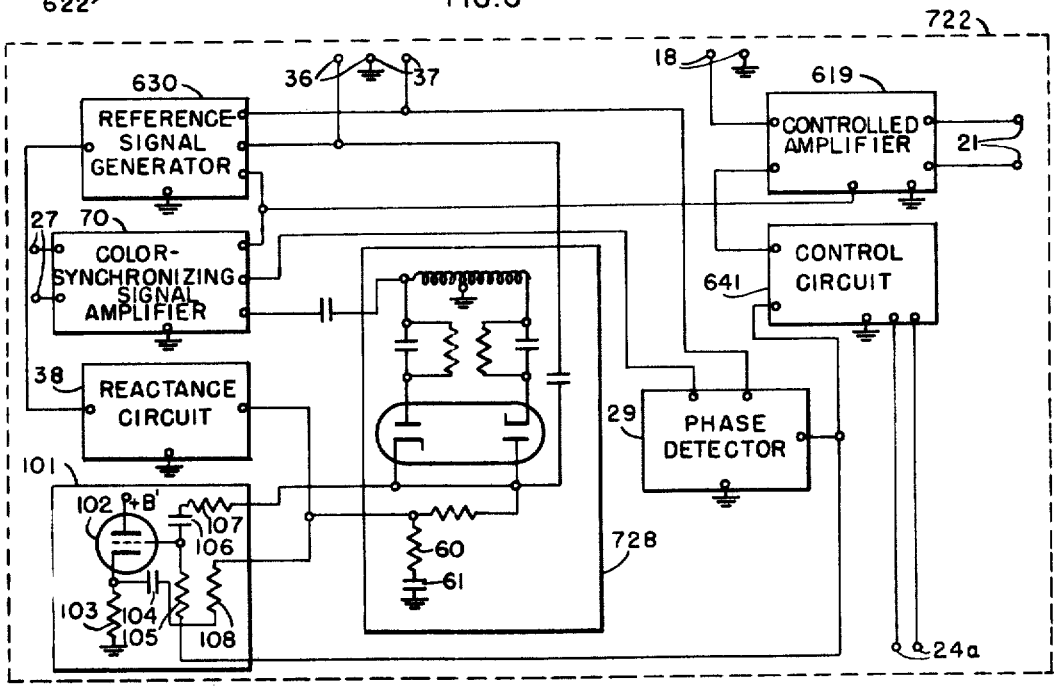
FIG. 7 is a circuit diagram, partly schematic, of still another form of a control apparatus in accordance with the present invention.

Description and explanation of operation of control apparatus of FIG. 7

Though the apparatus of FIG. 6 utilizes the unidirectional control signal developed by the second phase-detector system to extend the pull-in range and decrease the pull-in time for the APC system, it may be desirable to effect further increased extensions of such range and reduction of such time. The control apparatus of FIG. 7 utilizes the unidirectional control signal to effect such further extension of range and reduction of time. The majority of the units and circuit elements of the apparatus of FIG. 7 are similar to corresponding units or elements in the apparatus of FIG. 6 and such units are, therefore, designated by the same reference numerals. Other units and elements in the apparatus of FIG. 7 correspond to elements in the apparatus of FIG. 6 but differ therefrom and are, therefore, designated by the same reference numerals with 700 added thereto. Units and circuit elements not corresponding to any in the apparatus of FIG. 6 are designated by numerals between 101–108, inclusive.

The second phase-detector system in the apparatus 722 of FIG. 7 includes a phase detector 728 similar to the corresponding detectors 28 in FIGS. 1a and 6 except for circuit connections thereto. The apparatus 722 also includes the reactance circuit 38, and, in addition, includes an amplifier 101 effectively coupled in parallel with a portion of the output circuit of the detector 728, that is, in parallel with the resistor which is connected between the interconnected anode and diode of the tube in the phase detector 728 and the high-potential terminal of the resistor 60.

The amplifier 101 includes a tube such as a triode 102 having the anode thereof connected to a source of potenthe +B′ and the cathode connected through a load resistor 103 to chassis-ground. The cathode is also coupled through the series circuit of a condenser 104 and a resistor 108 to the input circuit of the reactance circuit 38. The control electrode of the tube 102 is coupled through the series circuit of a condenser 106 and a resistor 107 to the aforementioned interconnected anode and cathode in the output circuit of the phase detector 728. Such triode is also connected through an isolating resistor 105 to the output circuit of the phase detector 29.

Considering now the operation of the apparatus of FIG. 7, the units 29, 38, 70, 619, 630, and 641 operate in the manner explained with reference to the apparatus of FIG. 6. The phase detector 728 operates in the manner explained with reference to the phase detector 28 of FIG. 1a when the generator 630 is operating in synchronism. At this time, the triode 102 in the amplifier 101 is in a nonconductive state and, thus, the parallel circuit provided by the amplifier 101 is ineffective to amplify any error signal for application to the reactance circuit 38. The triode 102 is maintained in such nonconductive state by the negative potential applied from the output circuit of the detector 29 through the resistor 105 to the control electrode of such triode.

When the operation of the generator 630 becomes asynchronous and the potential developed in the output circuit of the phase detector 29 becomes approximately zero, the triode 102 begins to conduct and the beat-note error signal developed in the output circuit of the phase detector 728 is applied through the resistor 107 and the condenser 106 to the control electrode of the tube 102, is amplified thereby, and the amplified error signal is applied to the reactance circuit 38 through the condenser 104 and the resistor 108. In this way, the intensity of the unidirectional error signal applied to the reactance circuit 38 is increased when the operation of the generator 630 is asychronous. Referring to the curves of FIG. 8, this increase in intensity of the error signal effectively changes the operating characteristic of the APC system including the units 728, 101, and 38 from that represented by curve A to that represented by curve C. It is apparent that the utilization of the amplifier 101 increases the pull-in range and decreases the pull-in time.

In considering the operating characteristic represented by curve C of FIG. 8, it should be understood that such characteristic depends upon the values of the circuit elements utilized in the amplifier 101 and can be made to coincide with the characteristic represented by curve B and explained with reference to FIG. 6 by a proper selection of such circuit elements. For the purpose of simplicity of representation, the curves B and C have been represented as not coinciding, though in practice they might coincide if proper circuit constants are utilized. In addition, it should be understood that if, as represented by the apparatus of FIG. 7, both the improvement described with reference to FIG. 6 and that just described with reference to FIG. 7 are utilized, then the pull-in range and pull-in time of the APC system in the apparatus of FIG. 7 are effectively extended so as to have the characteristic represented by curve D of FIG. 8.

While applicant does not intend to be limited thereby, the following circuit constants are presented as illustrative of values that may be utilized in those portions of the control apparatus of FIG. 7 which differ from portions of FIG. 6:

| | | |
|---|---|---|
| Resistor **103** | kilohms | 3.3 |
| Resistor **105** | megohms | 1.5 |
| Resistor **107** | do | 22 |
| Resistor **108** | kilohms | 2.7 |
| Condenser **104** | microfarads | 0.47 |
| Condenser **106** | do | 0.01 |
| Tube **102** | Type ½ 12AT7 | |
| Potential +B′ | volts | +75 |

In accordance with the present invention, the unidirectional control signal developed by the second detector system in the control apparatus and including the phase detector 29 in the embodiments of FIGS. 1, 1a, 6, and 7 may be utilized to effect the above described improvements in the operation of the APC system for controlling the reference-signal generator in a color-television receiver. In other words, in accordance with the present invention, such unidirectional control signal will not only automatically switch the operation of such color-television receiver from that normal for a color-television receiver to that which is conventional for a monochrome television receiver but will also improve the pull-in range and pull-in time for the color-synchronizing circuits in such receiver whenever the need for such improvement is indicated by the lack of synchronous operation of the reference-signal generator in such color-synchronizing system.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A compatible color-television receiver comprising: means for receiving either a monochrome image-representative signal or a color image-representative signal including a component representative of the luminance, a component representative of the chrominance, and repetitive color synchronizing signals liable to accompanying noise signals; an image-reproducing device for reproducing either a monochrome or a color image; a monochrome channel between said means and device for translating either said monochrome signal or said luminance component; and a chrominance-signal deriving apparatus between said means and device for translating said chrominance component icluding: means for deriving said chrominance component and synchronizing signals from said color signal, a color reference-signal generator which normally generates reference oscillations in synchronism with said synchronizing signals at a desired phase relation thereto but which may be undesirably out of such synchronism, synchronizing means responsive to said synchronizing signals for normally maintaining said oscillations in such synchronism at said desired phase relation with said synchronizing signals, means including a single phase detector responsive jointly to said synchronizing signals and to said reference oscillations for producing a phase indicative unidirectional control voltage highly immune to said noise signals when said synchronizing signals and oscillations are in such synchronism at said desired phase relation and a lesser control voltage both when said synchronizing signals are absent and when they are out of such synchronism with said oscillations, and means responsive to said unidirectional control voltage for controlling the operation of said apparatus in one mode when said oscillations and said synchronizing signals are in such synchronism at said desired phrase relation and in another mode when said synchronizing signals are absent and when they are present but are out of such synchronism with said oscillations.

2. A compatible color-television receiver comprising: means for receiving either a monochrome image-representative signal or a color image-representative signal including a component representative of the luminance, a component representative of the chrominance and repetitive color synchronizing signals liable to accompanying noise signals; an image-reproducing device for reproducing either a monochrome or a color image; a monochrome channel between said means and device for translating either said monochrome signal or said luminance component; and a chrominance-signal deriving apparatus between said means and device for translating said chrominance component including: means for deriving said chrominance component and synchronizing signals from said color signal, a color reference-signal generator which normally generates reference oscillations in synchronism with said synchronizing signals at a quadrature-phase relation thereto but which may be undesirably out of such synchronism, synchronizing means responsive to said synchronizing signals for normally maintaining said oscillations in such synchronism at said quadrature-phase relation with said synchronizing signals, means including a single phase detector responsive jointly to said synchronizing signals and to said reference oscillations for producing a phase indicative unidirectional control voltage highly immune to said noise signals when said synchronizing signals and oscillations are in such synchronism at said quadrature-phase relation and a lesser control voltage both when said synchronizing signals are absent and when they are out of such synchronism with said oscillations, and means responsive to said unidirectional control voltage for controlling the operation of said apparatus in one mode when said oscillations and said synchronizing signals are in such synchronism at said quadrature-phase relation and in another mode when said synchronizing signals are absent and when they are present but are out of such synchronism with said oscillations.

3. A synchronizing system which is highly stable in the presence of noise signals comprising: means for supplying a synchronizing signal liable to accompanying noise signals; a generator for generating oscillations in synchronism with said synchronizing signal at a desired phase relation thereto but which may be undesirably out of such synchronism; synchronizing means for normally maintaining said oscillations in such synchronism at said desired phase relation with said synchronizing signal including means for confining the response of said synchronizing means to noise signals during in-synchronism operation to a narrow pass band of frequencies, whereby its pull-in performance from out-of-synchronism is unsatisfactory; means including a phase detector responsive jointly to said synchronizing signal and to said oscillations for producing a phase indicative unidirectional control signal when said signals are in such synchronism at said desired phase relation and a lesser control signal both when said synchronizing signal is absent and when it is present but is out of such synchronism with said oscillations; and means responsive to said control signals for conditioning said synchronizing means for improved pull-in performance when operating out of such synchronism and for said response when operating in such synchronism.

4. A synchronizing system for a television receiver which is highly stable in the presence of noise signals comprising: means for supplying a television signal including a synchronizing signal liable to accompanying noise signals; a generator for generating oscillations in synchronism with said synchronizing signal at a desired phase relation thereto but which may be undesirably out of such synchronism; synchronizing means for normally maintaining said oscillations in such synchronism at said desired phase relation with said synchronizing signal including means for confining the response of said synchronizing means to noise signals during in-synchronism operation to a narrow pass band of frequencies, whereby its pull-in performance from out-of-synchronism is unsatisfactory; means including a phase detector responsive jointly to said synchronizing signal and to said oscillations for producing a phase indicative unidirectional control signal when said signals are in such synchronism at said desired phase relation and a lesser control signal both when said synchronizing signal is absent and when it is present but is out of such synchronism with said oscillations; and means responsive to said control signals for conditioning said synchronizing means for improved pull-in performance when operating out of such synchronism and for said response when operating in such synchronism.

5. A synchronizing system for color-signal deriving apparatus of a color-television receiver which is highly stable in the presence of noise signals comprising: means for supplying a color image-representative signal including a subcarrier wave signal modulated at different phase points and a color synchronizing signal liable to accompanying noise signals; a reference-signal generator for generating color reference oscillations in synchronism with said synchronizing signal at a desired phase relation thereto but which may be undesirably out of such synchronism; synchronizing means for normally maintaining such oscillations in such synchronism at said desired phase relation with said synchronizing signal including means for confining the response of said synchronizing means to noise signals during in-synchronism operation to a narrow pass band of frequencies, whereby its pull-in performance from out-of-synchronism is unsatisfactory; means including a phase detector responsive jointly to said synchronizing signal and to said oscillations for prodncing a phase indicative unidirectional control signal when said signals are in such synchronism at said desired phase relation and a lesser control signal both when said synchronizing signal is absent and when it is present but is out of such synchronism with said oscillations; and means responsive to said control signals for conditioning said synchronizing means for improved pull-in performance when operating out of such synchronism and for said response when in such synchronism.

6. A synchronizing system for a television receiver which is highly stable in the presence of noise signals comprising: means for supplying a television signal including a synchronizing signal liable to accompanying noise signals; a generator for generating oscillations in synchronism with said synchronizing signal at a desired phase relation thereto but which may be undesirably out of such synchronism; synchronizing means including an automatic-phase-control system for normally maintaining said oscillations in such synchronism at said desired phase relation with said synchronizing signal including a phase detector and means for confining the response of said automatic-phase-control system to noise signals during in synchronism operation to a narrow pass band of frequencies, whereby its pull-in performance from out-of-synchronism is unsatisfactory; means including a phase detector responsive jointly to said synchronizing signal and to said oscillations for producing a phase indicative unidirectional control signal when said signals are in such synchronism at said desired phase relation and a lesser control signal both when said synchronizing signal is absent and when it is present but is out of such synchronism with said oscillations; and means responsive to said control signals for conditioning said automatic-phase-control system for improved pull-in performance when operating out of such synchronism and for said response when operating in such synchronism.

7. A synchronizing system for a television receiver which is highly stable in the presence of noise signals comprising: means for supplying a television signal including a synchronizing signal liable to accompanying noise signals; a generator for generating oscillations in synchronism with said synchronizing signal at a desired phase relation thereto but which may be undesirable out of such synchronism; synchronizing means including an automatic-phase-control system for normally maintaining said oscillations in such synchronism at said desired phase relation with said synchronizing signal including a phase detector and means for confining the response of said automatic-phase-control system to noise signals during in-synchronism operation to a narrow pass band of frequencies, whereby its pull-in performance from out-of-synchronism is unsatisfactory; means including a phase detector responsive jointly to said synchronizing signal and to said oscillations for producing a phase indicative unidirectional control signal when said signals are in such synchronism at said desired phase relation and a lesser control signal both when said synchronizing signal is absent and when it is present but is out of such synchronism with said oscillations; and means responsive to said control signals for increasing the gain of said automatic-phase-control system to improve the pull-in performance of said automatic-phase-control system when operating out of such synchronism and for decreasing said gain when in such synchronism to leave said automatic-phase-control system with said response.

8. A synchronizing system for a television receiver which is highly stable in the presence of noise signals comprising: means for supplying a television signal including a synchronizing signal liable to accompanying noise signals; a generator for generating oscillations in synchronism with said synchronizing signal at a desired phase relation thereto but which may be undesirably out of such synchronism; synchronizing means including an automatic-phase-control system for normally maintaining said oscillations in such synchronism at said desired phase relation with said synchronizing signal including a phase detector and means for confining the response of said automatic-phase-control system to noise signals during in-synchronism operation to a narrow pass band of frequencies, whereby its pull-in performance from out-of-synchronism is unsatisfactory; means including a phase detector responsive jointly to said synchronizing signal and to said oscillations for producing a phase indicative unidirectional control signal when said signals are in such synchronism at said desired phase relation and a lesser control signal both when said synchronizing signal is absent and when it is present but is out of such synchronism with said oscillations; and means responsive to said control signals for increasing the alternating-current gain of said automatic-phase-control system to improve the pull-in performance of said automatic-phase-control system when operating out of such synchronism and for decreasing said gain when in such synchronism to leave said automatic-phase-control system with said response.

9. A synchronizing system for a television receiver which is highly stable in the presence of noise signals comprising: means for supplying a television signal including a synchronizing signal liable to accompanying noise signals; a generator for generating oscillations in synchronism with said synchronizing signal at a quadrature-phase relation thereto but which may be undesirably out of such synchronism; synchronizing means including an automatic-phase-control system for normally maintaining said oscillations in such synchronism at a quadrature-phase relation with said synchronizing signal including a phase detector and means for confining the response of said automatic-phase-control system to noise signals during in-synchronism operation to a narrow pass band of frequencies, whereby its pull-in performance from out-of-synchronism is unsatisfactory; means including a phase detector responsive jointly to said synchronizing signal and to said oscillations for producing a phase indicative unidirectional control signal when said signals are in such synchronism at said quadrature-phase relation and a lesser control signal both when said synchronizing signal is absent and when it is present but is out of such synchronism with said oscillations; and means responsive to said control signals for conditioning said automatic-phase-control system for improved pull-in performance when operating out of such synchronism and for said response when operating in such synchronism.

10. A synchronizing system for a television receiver which is highly stable in the presence of noise signals comprising: means for supplying a television signal including a synchronizing signal liable to accompanying noise signals; a generator for generating oscillations in synchronism with said synchronizing signal at a quadrature-phase relation thereto but which may be undesirably out of such synchronism; synchronizing means including an automatic-phase-control system for normally maintaining said oscillations in such synchronism at a quadrature-phase relation with said synchronizing signal including a phase detector and means for confining the response of said automatic-phase-control system to noise signals during in-synchronism operation to a narrow pass band of frequencies, whereby its pull-in performance from out-of-synchronism is unsatisfactory; means including phase-shift means and a phase detector responsive jointly to said synchronizing signal and to said oscillations 90° from said quadrature-phase relation for produring a phase indicative unidirectional control signal when said signals are in such synchronism at said quadrature-phase relation and a lesser control signal both when said synchronizing signal is absent and when it is present but is out of such synchronism with said oscillations;

and means responsive to said control signals for conditioning said automatic-phase-control system for improved pull-in performance when operating out of such synchronism and for said response when operating in such synchronism.

11. A synchronizing system which is highly stable in the presence of noise signals comprising: means for supplying a synchronizing signal liable to accompanying noise signals; a generator for generating oscillations in synchronism with said synchronizing signal at a desired phase relation thereto but which may be undesirably out of such synchronism; synchronizing means for normally maintaining said oscillations in such synchronism at said desired phase relation with said synchronizing signal including means for confining the response of said synchronizing means to noise signals during in-synchronism operation to a narrow pass band of frequencies, whereby its pull-in performance from out-of-synchronism is unsatisfactory; means including phase-shift means and a phase detector responsive jointly to said synchronizing signal and to said oscillations at a phase relation differing from said desired phase relation for producing a phase indicative unidirectional control signal when said signals are in such synchronism at said desired phase relation and a lesser control signal both when said synchronizing signal is absent and when it is present but is out of such synchronism with said oscillations; and means responsive to said control signals for conditioning said synchronizing means for improved pull-in performance when operating out of such synchronism and for said response when operating in such synchronism.

12. A control system for a color-television receiver comprising: means for supplying a composite video-frequency signal including a chrominance component and a color synchronizing signal; a channel for translating said chrominance component; a color reference-signal generator for generating reference oscillations in synchronism with said synchronizing signal at a desired phase relation thereto; synchronizing means responsive to said synchronizing signal for normally maintaining said reference oscillations in synchronism at said desired phase relation with said synchronizing signal; means including a phase detector responsive jointly to said synchronizing signal and to said reference oscillations for producing a phase indicative unidirectional control signal when said synchronizing signal and oscillations are in-synchronism at said desired phase relation and a lesser control signal when said synchronizing signal is absent; and means responsive to said control signals for enabling said chrominance channel when said synchronizing signal and oscillations are in such synchronism and for disabling said chrominance channel when said synchronizing signal is absent.

13. A color channel control system for a color-television receiver which operates with a high degree of certainty in the presence of noise signals comprising: means for supplying a composite video-frequency signal including a chrominance component and a color synchronizing signal liable to accompanying noise signals; a channel for translating said chrominance component; a color reference-signal generator for generating reference oscillations in synchronism with said synchronizing signal at a desired phase relation thereto; synchronizing means responsive to said synchronizing signal for normally maintaining said reference oscillations in-synchronism at said desired phase relation with said synchronizing signal; means including a phase detector responsive jointly to said synchronizing signal and to said reference oscillations for producing a phase indicative unidirectional control signal highly immune to noise signals when said synchronizing signals and oscillations are in-synchronism at said desired phase relation and a lesser control signal when said synchronizing signal is absent; and means responsive to said control signals for enabling said chrominance channel when said synchronizing signal and oscillations are in such synchronism and for disabling said chrominance channel when said synchronizing signal is absent.

14. A color channel control system for a compatible color-television receiver which operates with a high degree of certainty in the presence of noise signals comprising: means for receiving either a monochrome image-representative signal or a color image-representative signal including a component representative of the luminance, a component representative of the chrominance and repetitive color synchronizing signals liable to accompanying noise signals; an image-reproducing device for reproducing either a monochrome or a color image; a monochrome channel for translating either said monochrome signal or said luminance component between said means and device; a chrominance channel for translating said chrominance component between said means and device; a color reference -signal generator for generating reference oscillations in synchronism with said synchronizing signals at a desired phase relation thereto; a synchronizing means for normally maintaining said reference oscillations in-synchronism at said desired phase relation with said synchronizing signals; means including a phase detector responsive jointly to said synchronizing signals and to said reference oscillations for producing a phase indicative unidirectional control signal when said synchronizing signals and oscillations are in-synchronism at said desired phase relation and a lesser control signal when said synchronizing signals are absent; and means responsive to said control signals for enabling said chrominance channel when said synchronizing signals and oscillations are in such synchronism and for disabling said chrominance channel when said synchronizing signals are absent.

15. A color channel control system for a compatible color-television receiver which operates with a high degree of certainty in the presence of noise signals comprising: means for receiving either a monochrome image-representative signal or a color image-representative signal including a component representative of the luminance, a component representative of the chrominance and repetitive color synchronizing signals liable to accompanying noise signals; an image-reproducing device for reproducing either a monochrome or a color image; a monochrome channel for translating either said monochrome signal or said luminance component between said means and device; a chrominance channel for translating said chrominance component between said means and device; a color reference-signal generator for generating reference oscillations in synchronism with said synchronizing signals at a desired phase relation thereto; synchronizing means for normally maintaining said reference oscillations in-synchronism at said desired phase relation with said synchronizing signals; means including a phase detector responsive jointly to said synchronizing signals and to said reference oscillations for producing a phase indicative unidirectional control signal when said synchronizing signals and oscillations are in-synchronism at said desired phase relation and a lesser control signal both when said synchronizing signals are absent and when they are out of such synchronism with said oscillations; and means responsive to said control signals for enabling said chrominance channel when said synchronizing signals and oscillations are in such synchronism and for disabling said chrominance channel both when said synchronizing signals are absent and when they are out of such synchronism with said oscillations.

16. A color channel control system for a compatible color-television receiver which operates with a high degree of certainty in the presence of noise signals comprising: means for receiving either a monochrome image-representative signal or a color image-representative signal including a component representative of the luminance, a component representative of the chrominance and repetitive color synchronizing signals liable to accompanying noise signals; an image-reproducing device for reproducing either a monochrome or a color image; a monochrome channel for translating either said monochrome signal or said luminance component between said means and device; a chrominance channel for translating said chrominance component between said means and device; a color reference-signal generator for generating reference oscillations in synchronism with said synchronizing signals at a desired phase relation thereto; synchronizing means for normally maintaining said reference oscillations in-synchronism at said desired phase relation with said synchronizing signals; means including phase-shift means and a phase detector responsive jointly to said synchronizing signals and to said reference oscillations at a phase relation differing from said desired phase relation for producing a phase indicative unidirectional control signal when said synchronizing signals and oscillations are in-synchronism at said desired phase relation and a lesser control signal when said synchronizing signals are absent; and means responsive to said control signals for enabling said chrominance channel when said synchronizing signals and oscillations are in such synchronism and for disabling said chrominance channel when said synchronizing signals are absent.

17. A color channel control system for a compatible color-television receiver which operates with a high degree of certainty in the presence of noise signals comprising: means for receiving either a monochrome image-representative signal or a color image-representative signal including a component representative of the luminance, a component representative of the chrominance and repetitive color synchronizing signals liable to accompanying noise signals; an image-reproducing device for reproducing either a monochrome or a color image; a monochrome channel for translating either said monochrome signal or said luminance component between said means and device; a chrominance channel for translating said chrominance component between said means and device; a color reference-signal generator for generating reference oscillations in synchronism with said synchronizing signals at a quadrature-phase relation thereto; synchronizing means for normally maintaining said reference oscillations in-synchronism at said quadrature-phase relation with said synchronizing signals; means including phase-shift means and a phase detector responsive jointly to said synchronizing signals and to said reference oscillations 90° from said quadrature-phase relation for producing a phase indicative unidirectional control signal when said synchronizing signals and oscillations are in-synchronism at said quadrature-phase relation and a lesser control signal when said synchronizing signals are absent; and means responsive to said control signals for enabling said chrominance channel when said synchronizing signals and oscillations are in such synchronism and for disabling said chrominance channel when said synchronizing signals are absent.

18. A color channel control system for a compatible color-television receiver which operates with a high degree of certainty in the presence of noise signals comprising: means for receiving either a monochrome image-representative signal or a color image-representative signal including a component representative of the luminance, a component representative of the chrominance and repetitive color synchronizing signals liable to accompanying noise signals; an image-reproducing device for reproducing either a monochrome or a color image; a monochrome channel for translating either said monochrome signal or said luminance component between said means and device; a chrominance channel for translating said chrominance component between said means and device; a color reference-signal generator for generating first and second reference oscillations in quadrature with each other and in synchronism with said synchronizing signals with said first oscillations at a desired phase relation thereto for detection of said chrominance component; synchronizing means for normally maintaining said reference oscillations in such synchronism with said synchronizing signals; means including a phase detector responsive jointly to said synchronizing signals and to said second reference oscillations for producing a phase indicative unidirectional control signal when said synchronizing signals and first oscillations are in-synchronism at said desired phase relation and a lesser control signal when said synchronizing signals are absent; and means responsive to said control signals for enabling said chrominance channel when said synchronizing signals and oscillations are in such synchronism and for disabling said chrominance channel when said synchronizing signals are absent.

19. A color channel control system for a compatible color-television receiver which operates with a high degree of certainty in the presence of noise signals comprising: means for receiving either a monochrome image-representative signal or a color image-representative signal including a component representative of the luminance, a component representative of the chrominance and repetitive color synchronizing signals liable to accompanying noise signals; an image-reproducing device for reproducing either a monochrome or a color image; a monochrome channel between said means and device for translating either said monochrome signal or said luminance component; a chrominance channel between said means and device for translating said chrominance component; a color reference-signal generator for generating reference oscillations in synchronism with said synchronizing signals at a desired phase relation thereto; synchronizing means responsive to said synchronizing signals for normally maintaining said reference oscillations in such synchronism at said desired phase relation with said synchronizing signals including means for confining the response of said synchronizing means to noise signals during in-synchronism operation to a narrow pass band of frequencies, whereby its pull-in performance from out-of-synchronism is unsatisfactory; means including a phase detector responsive jointly to said synchronizing signals and to said reference oscillations for producing a phase indicative unidirectional control signal when said synchronizing signals and oscillations are in-synchronism at said desired phase relation and a lesser control signal both when said synchronizing signals are absent and when they are present but are out of such synchronism with said oscillations; means responsive to said control signals for enabling said chrominance channel when said synchronizing signals and oscillations are in such synchronism and for disabling said chrominance channel both when said synchronizing signals are absent and when they are present but are out of synchronism with said oscillations; and means responsive to said control signals for conditioning said synchronizing means for improved pull-in performance when operating out of such synchronism and for said response when in such synchronism.

20. A color channel control system for a compatible color-television receiver which operates with a high degree of certainty in the presence of noise signals comprising: means for receiving either a monochrome image-representative signal or a color image-representative signal including a component representative of the luminance, a component representation of the chrominance and repetitive color synchronizing signals liable to accompanying noise signals; an image-reproducing device for reproducing either a monochrome or a color image; a monochrome channel between said means and device for translating either said monochrome signal or said luminance component; a chrominance channel between said means and device for translating said chrominance component; a color reference-signal generator for generating reference oscillations in synchronism with said synchronizing signals at a desired phase relation thereto; synchronizing means including a automatic-phase-control system for normally maintaining said reference oscillations in such synchronism at said desired phase relation with said synchronizing signal including a phase detector and means for confining the response of said automatic-phase-control system to noise signals during in-synchronism operation to a narrow pass band of frequencies, whereby its pull-in performance from out-of-synchronism is unsatisfactory; means including a phase detector responsive jointly to said synchronizing signals and to said reference oscillations for producing a phase indicative unidirertional control signal when said synchronizing signals and oscillations are in-synchronism at said desired phase relation and a lesser control signal both when said synchronizing signals are absent and when they are present but are out of such synchronism with said oscillations; means responsive to said control signals for enabling said chrominance channel when said synchronizing signals and oscillations are in such synchronism and for disabling said chrominance channel both when said synchronizing signals are absent and when they are present but are out of synchronism with said oscillations; and means responsive to said control signals for conditioning said automatic-phase-control system for improved pull-in performance when operating out of such synchronism and for said response when in such synchronism.

21. A color channel control system for a compatible color-television receiver which operates with a high degree of certainty in the presence of noise signals comprising: means for receiving either a monochrome image representative signal or a color image-representative signal including a component representative of the luminance, a component representative of the chrominance and repetitive color synchronizing signals liable to accompanying noise signals; an image-reproducing device for reproducing either a monochrome or a color image; a monochrome channel between said means and device for translating either said monochrome signal or said luminance component; a chrominance channel between said means and device for translating said chrominance component; a color reference-signal generator for generating reference oscillations in synchronism with said synchronizing signals at a desired phase relation thereto; synchronizing means responsive to said synchronizing signals for normally maintaining said reference oscillations in such synchronism at said desired phase relation with said synchronizing signal including means for confining the response of said synchronizing means to noise signals during in-synchronism operation to a narrow pass band of frequencies, whereby its pull-in performance from out-of-synchronism is unsatisfactory; means including phase-shift means and a phase detector responsive jointly to said synchronizing signals and to said reference oscillations at a phase relation differing from said desired phase relation for producing a phase indicative unidirectional control signal when said synchronizing signals and oscillations are in-synchronism at said desired phase relation and a lesser control sginal both when said synchronizing signals are absent and when they are present but are out of such synchronism with said oscillations; means responsive to said control signals for enabling said chrominance channel when said synchronizing signals and oscillations are in such synchronism and for disabling said chrominance channel both when said synchronizing signals are absent and when they are present but are out of synchronism with said oscillations; and means responsive to said control signals for conditioning said synchronizing means for improved pull-in performance when operating out of such synchronism and for said response when in such synchronism.

22. A color channel control system for a compatible color-television receiver which operates with a high degree of certainty in the presence of noise signals comprising: means for receiving either a monochrome image-representative signal or a color image-representative signal including a component representative of the luminance, a wave signal modulated by components representative of the chrominance and repetitive color synchronizing signals of the frequency of said wave signal and liable to accompanying noise signals; an image-reproducing device for reproducing either a monochrome or a color image; a monochrome channel between said means and device for translating either said monochrome signal or said luminance component; a chrominance channel between said means and device for translating said wave signal and chrominance components; a color reference-signal generator for generating first and second reference oscillations in quadrature with each other in synchronism with said synchronizing signals with said first oscillations at a desired phase relation thereto; synchronizing means responsive to said synchronizing signals for normally maintaining said reference oscillations in such synchronism with said synchronizing signals including means for confining the response of said synchronizing means to noise signals during in-synchronism operation to a narrow pass band of frequencies, whereby its pull-in performance from out-of-synchronism is unsatisfactory; means for utilizing said oscillations for synchronously detecting said chrominance components in said chrominance channel; means including a phase detector responsive jointly to said synchronizing signals and to said second reference oscillations for producing a phase indicative unidirectional control signal when said synchronizing signals and first oscillations are in-synchronism at said desired phase relation and a lesser control signal both when said synchronizing signals are absent and when they are present but are out of such synchronism with said osillations; means responsive to said control signals for enabling said chrominance channel when said synchronizing signals and oscillations are in such synchronism and for disabling said chrominance channel both when said synchronizing signals are absent and when they are present but are out of synchronism with said oscillations; and means responsive to said control signals for conditioning said synchronizing means for improved pull-in performance when operating out of such synchronism and for said response when in such synchronism.

*23. A control apparatus for a compatible color-television receiver wherein it is desired automatically to switch off the apparatus for translating color signals when no color signals are being received and to turn on such apparatus when color signals are being received comprising: means for supplying a composite video frequency signal including color signals and a color synchronizing signal; means for translating said color signals; means including a color reference signal generator for generating reference oscillations in synchronism with said synchronizing signal at a desired phase relation thereto; means including a phase detector responsive jointly to said synchronizing signal and to said reference oscillations for producing a control signal indicative of the in-phase component between said synchronizing signal and reference oscillations and having one value when said synchronizing signal and oscillations are in synchronism at said desired phase relation and another value when said synchronizing signal is absent; and means responsive to said control signal for enabling translation of said color signals when said synchronizing signal and oscillations are in such synchronism at said desired phase relation thereto and for disabling said translation when said synchronizing signal is absent.*

*24. A control apparatus for a compatible color-television receiver wherein it is desired automatically to switch off the apparatus for translating color signals when no color signals are being received and to turn on such apparatus when color signals are being received comprising; means for supplying a composite video frequency signal including color signals and a color synchronizing signal; means for translating said color signals; means including a color reference signal generator for generating reference oscillations in synchronism with said synchronizing signal at a desired phase; relation thereto means including a phase detector responsive jointly to*

*said synchronizing signal and to said reference oscillations for producing a control signal indicative of the in-phase component between said synchronizing signal and reference oscillations and having one value when said synchronizing signal and oscillations are in synchronism at said desired phase relation and another value both when said synchronizing signal is absent and when it is present but out of synchronism with said reference oscillations; and means responsive to said control signal for enabling translation of said color signals when said synchronizing signal and oscillations are in such synchronism at said desired phase relation thereto and for disabling said translation both when said synchronizing signal is absent and when it is present but out of synchronism with said reference oscillations.*

*25. A synchronizing system which is highly stable in the presence of noise signals comprising: means for supplying a synchronizing signal liable to accompanying noise signals; a generator for generating oscillations in synchronism with said synchronizing signal at a desired phase relation thereto but which may be undesirably out of such synchronism; synchronizing means for normally maintaining said oscillations in such synchronism at said desired phase relation with said synchronizing signal including means for confining the response of said synchronizing means to noise signals during in-synchronism operation to a narrow pass band of frequencies, whereby its pull-in performance from out-of-synchronism is unsatisfactory; means including a phase detector responsive jointly to said synchronizing signal and to said oscillations for producing a control signal indicative of the in-phase component between said synchronizing signal and oscillations and having one value when said signals are in such synchronism at said desired phase relation and another value both when said synchronizing signal is absent and when it is present but is out of such synchronism with said oscillations; and means responsive to said control signal for conditioning said synchronizing means for improved pull-in performance when operating out of such synchronism and for said response when operating in such synchronism.*

*26. A control apparatus for a compatible color-television receiver wherein it is desired automatically to switch off the apparatus for translating color signals when no color signals are being received and to turn on such apparatus when color signals are being received comprising: means for supplying a composite video frequency signal including color signals and a color synchronizing signal; means for translating said color signals; means including a color reference signal generator for generating reference oscillations in synchronism with said synchronizing signal at a desired phase relation thereto; synchronizing means including a phase detector responsive to said signal and said reference oscillations for maintaining said reference oscillations in synchronism at said desired phase relation with said synchronizing signal; means including a second phase detector responsive jointly to said synchronizing signal and to said reference oscillations for producing a control signal indicative of the in-phase component of another phase relation between said synchronizing signal and reference oscillations and having one value when said synchronizing signal and oscillations are in synchornism at said desired phase relation and another value when said synchronizing signal is absent; and means responsive to said control signal for enabling translation of said color signals when said synchronizing signal and oscillations are in such synchronism at said desired phase relation thereto and for disabling said translation when said synchronizing signal is absent.*

*27. A control apparatus for a compatible color-television receiver wherein it is desired automatically to switch off the apparatus for translating color signals when no color signals are being received and to turn on such apparatus when color signals are being received comprising: means for supplying a composite video frequency signal including color signals and a color synchronizing signal; means for translating said color signals; means including a color reference signal generator for generating reference oscillations in synchronism with said synchronizing signal at a desired phase relation thereto; synchronizing means including a phase detector responsive to said signal and said reference oscillations for maintaining said reference oscillations in synchronism at said desired phase relation with said synchronizing signal; means including a second phase detector responsive jointly to said synchronizing signal and to said reference oscillations for producing a control signal indicative of the in-phase component of another phase relation between said synchronizing signal and reference oscillations and having one value when said synchronizing signal and oscillations are in synchronism at said desired phase relation and other value both when said synchronizing signal is absent and when it is present but out of such synchronism with said reference oscillations; and means responsive to said control signal for enabling translation of said color signals when said synchronizing signal and oscillations are in such synchronism at said desired phase relation thereto and for disabling said translation both when said synchronizing signal is absent and when it is present but out of such synchronism with said reference oscillations.*

*28. A synchronizing system which is highly stable in the presence of noise signals comprising: means for supplying a synchronizing signal liable to accompanying noise signals; a generator for generating oscillations in synchronism with said synchronizing signal at a desired phase relation thereto but which may be undesirably out of such synchronism; synchronizing means including a phase detector for normally maintaining said oscillations in such synchronism at said desired phase relation with said synchronizing signal including means for confining the response of said synchronizing means to noise signals during in-synchronizism operation to a narrow pass band of frequencies, whereby its pull-in performance from out-of-synchronism is unsatisfactory; means including a phase detector responsive jointly to said synchronizing signal and to said oscillations for producing a control signal indicative of the in-phase component of another phase relation between said synchronizing signal and oscillations and having one value when said signals are in such synchronism at said desired phase relation and another value both when said synchronizing signal is absent and when it is present but is out of such synchronism with said oscillations; and means responsive to said control signal for conditioning said synchronizing means for improved pull-in performance when operating out of such synchronism and for said response when operating in such synchronism.*

References Cited

The following references, cited by the Examiner, are of record in the patented file of this patent or the original patent.

UNITED STATES PATENTS

| | | | |
|---|---|---|---|
| 2,848,537 | 8/1958 | Richman | 178—69.5 |
| 2,744,155 | 5/1956 | Kihn | 178—5.4 |
| 2,740,046 | 4/1956 | Tellier | 178—69.5 |
| 2,648,722 | 8/1953 | Bradley. | |
| 2,735,886 | 2/1956 | Schlesinger. | |
| 2,752,417 | 6/1956 | Pritchard. | |
| 2,766,321 | 10/1956 | Parker. | |
| 2,771,557 | 11/1956 | Rogers et al. | |
| 2,835,728 | 5/1958 | Flood et al. | |

ROBERT L. GRFIFFIN, Primary Examiner

R. MURRAY, Assistant Examiner

U.S. Cl. X.R.

178—5.4